(12) United States Patent
Ohashi

(10) Patent No.: US 9,696,780 B2
(45) Date of Patent: Jul. 4, 2017

(54) INFORMATION PROCESSING APPARATUS, SYSTEM, MANAGEMENT APPARATUS, AND POWER STATUS CONTROL METHOD

(71) Applicant: CANON KABUSHIKI KAISHA, Tokyo (JP)

(72) Inventor: Toshio Ohashi, Chigasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 102 days.

(21) Appl. No.: 14/718,444

(22) Filed: May 21, 2015

(65) Prior Publication Data
US 2015/0355694 A1    Dec. 10, 2015

(30) Foreign Application Priority Data

Jun. 9, 2014    (JP) .................. 2014-119111

(51) Int. Cl.
| | |
|---|---|
| G06F 1/00 | (2006.01) |
| G06F 1/32 | (2006.01) |
| G06F 9/455 | (2006.01) |
| G06F 11/30 | (2006.01) |
| G06F 11/00 | (2006.01) |
| G06F 11/14 | (2006.01) |

(52) U.S. Cl.
CPC .......... *G06F 1/3203* (2013.01); *G06F 1/3206* (2013.01); *G06F 11/00* (2013.01); *G06F 11/142* (2013.01); *G06F 11/30* (2013.01); *G06F 11/3072* (2013.01); *G06F 2009/45591* (2013.01); *G06F 2201/86* (2013.01); *G06F 2209/508* (2013.01)

(58) Field of Classification Search
CPC .. G06F 2209/508; G06F 1/3203; G06F 11/30; G06F 11/3072; G06F 1/3206; G06F 2009/45591; G06F 2201/86; G06F 11/00; G06F 11/142
See application file for complete search history.

(56) References Cited

U.S. PATENT DOCUMENTS

| | | | | |
|---|---|---|---|---|
| 8,020,025 B2 * | 9/2011 | Hyatt | ............... | G06F 1/3203 713/320 |
| 8,560,873 B1 * | 10/2013 | Sosa | ............... | G06F 1/3203 713/323 |
| 2014/0173298 A1 * | 6/2014 | Bircher | ............ | G06F 1/3203 713/300 |
| 2014/0380409 A1 | 12/2014 | Ohashi | | |

FOREIGN PATENT DOCUMENTS

JP    2011-248526 A    12/2011

* cited by examiner

*Primary Examiner* — Xuxing Chen
(74) *Attorney, Agent, or Firm* — Fitzpatrick, Cella, Harper & Scinto

(57) ABSTRACT

It is sensed that an event has occurred which is a target of an event policy to transition power status with an event occurrence as a trigger, a setting of the event policy is acquired, it is determined whether or not a loop of power status transition has occurred, and the event policy is deactivated if the loop of the power status transition has occurred.

16 Claims, 11 Drawing Sheets

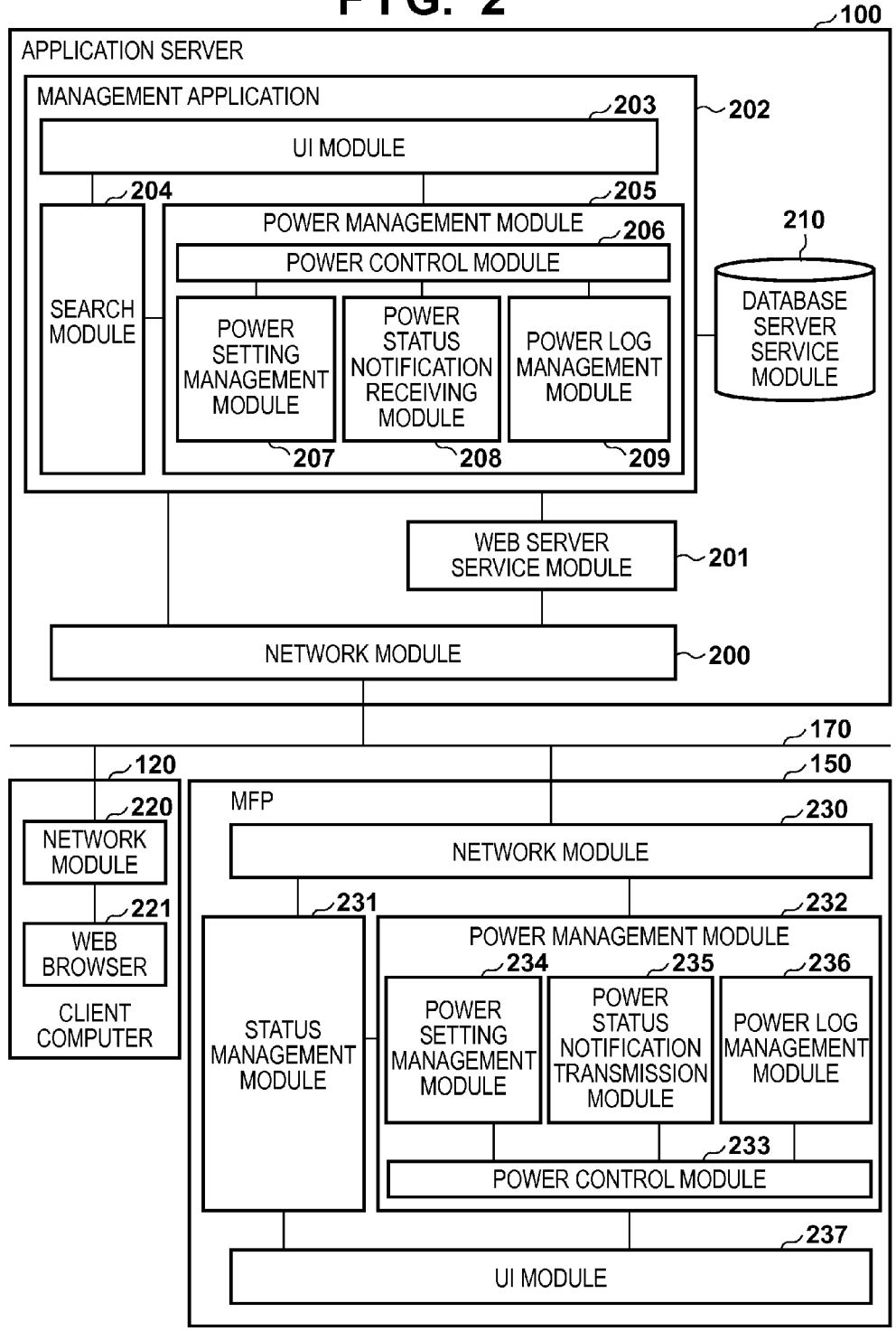

FIG. 3A ~300

| DEVICE ID ~3001 | DEVICE NAME ~3002 | MODEL NAME ~3003 | FW VERSION ~3004 | IP ADDRESS ~3005 | SERIAL NUMBER ~3006 | LAST UPDATE DATE AND TIME ~3007 |
|---|---|---|---|---|---|---|
| 1 | Device1 | Model A | 1.1 | 192.168.xx.xx | xx:xx:xx:xx:xx:xx | 2014/1/1 0:00 |
| 2 | Device2 | Model B | 2.0 | 192.168.xx.xx | xx:xx:xx:xx:xx:xx | 2014/1/1 0:00 |
| 3 | Device3 | Model C | 2.1 | 192.168.xx.xx | xx:xx:xx:xx:xx:xx | 2014/1/1 0:00 |

FIG. 3B ~301

| EVENT POLICY ID ~3011 | EVENT REQUEST POWER STATUS ~3012 | EVENT NAME ~3013 | EVENT POLICY STATUS ~3014 |
|---|---|---|---|
| 1 | resetSoft | alertRemovalOfBinaryChangeEntry | active |
| 2 | suspend | jam | active |
| 3 | standby | coverOpen | notInService |

FIG. 3C ~302

| TASK ID ~3021 | EXECUTION TIME ~3022 | STATUS ~3023 |
|---|---|---|
| 1 | 2014/1/1 0:00 | excuted |
| 2 | 2014/1/1 0:00 | canceled |
| 3 | 2014/3/1 0:00 | waiting |

FIG. 3D

| TASK ID 3031 | DEVICE ID 3032 | EVENT POLICY ID 3033 |
|---|---|---|
| 1 | 1 | 1 |
| 2 | 2 | 2 |
| 3 | 3 | 3 |

FIG. 3E

| NOTIFICATION ID 3041 | DEVICE ID 3042 | NOTIFICATION TYPE 3043 | TIME STAMP 3044 | EVENT REQUEST POWER STATUS 3045 | EVENT NAME 3046 | EVENT POLICY STATUS 3047 |
|---|---|---|---|---|---|---|
| 1 | 1 | Trap | 2014/1/15 10:00 | resetSoft | alertRemovalOfBinaryChangeEntry | destroy |
| 2 | 1 | Inform | 2014/1/16 11:30 | standby | jam | notReady |

FIG. 3F

| LOG ID 3051 | DEVICE ID 3052 | LOG POWER STATUS 3053 | LOG POWER STATUS MESSAGE 3054 | LOG POWER STATUS DATE AND TIME 3055 | LOG COMPONENT TYPE 3056 | LOG COMPONENT REFERENCE IDENTIFIER 3057 |
|---|---|---|---|---|---|---|
| 1 | 1 | suspend | suspended. | 2013/12/30 0:00 | generalPrinter | - |
| 2 | 1 | standby | standby | 2013/12/30 0:00 | generalPrinter | - |
| 3 | 2 | offHard | switch off | 2013/12/31 11:00 | generalPrinter | - |
| 4 | 2 | standby | standby | 2013/12/31 11:00 | generalPrinter | - |
| 5 | 2 | suspend | suspended. | 2013/12/31 14:00 | generalPrinter | - |

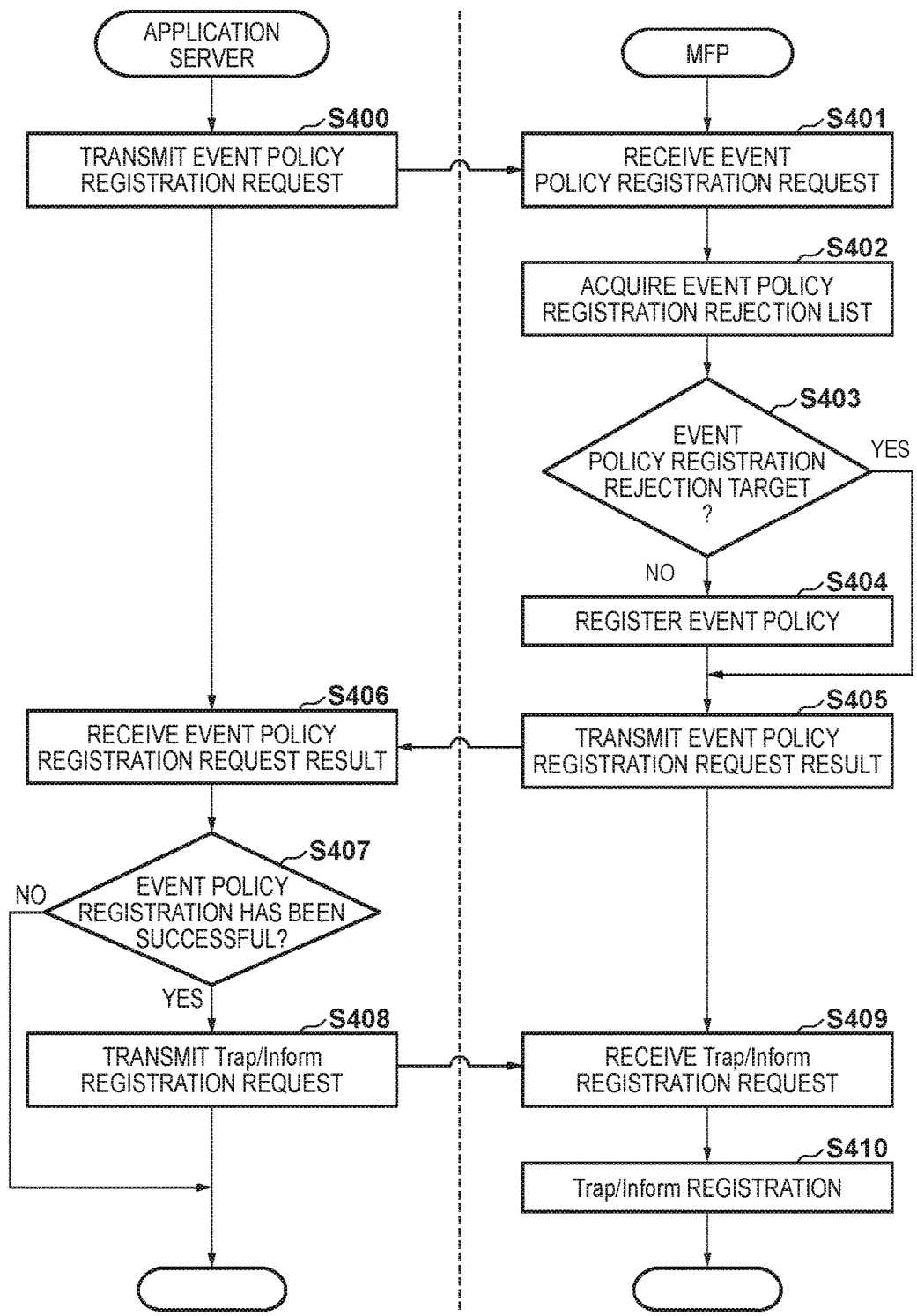

INFORMATION PROCESSING APPARATUS, SYSTEM, MANAGEMENT APPARATUS, AND POWER STATUS CONTROL METHOD

BACKGROUND OF THE INVENTION

Field of the Invention

The present invention relates to a technique by which an information processing apparatus or the like operates in accordance with an event policy, for example.

Description of the Related Art

Conventionally, there has been a technique by which, when an error occurs in an information processing apparatus and the apparatus enters an inoperable state, shutdown processing is performed to shut off power supply to all units (e.g., see Japanese Patent Laid-Open No. 2011-248526). In an event policy defined in PWG Imaging System Power MIB v1.0 (hereinafter, "PowerMIB"), a setting can be configured for causing power status of an information processing apparatus to transition in accordance with an event policy with an event such as an error occurrence as a trigger.

In the information processing apparatus that conforms to the event policy, there are cases where the same event continues to repeatedly occur, which is so-called a power status transition loop, as a result of causing the power status to transition in accordance with the event policy with an event occurrence as a trigger. This power status transition loop needs to be avoided.

SUMMARY OF THE INVENTION

The present invention has been made in view of the above conventional example, and provides a technique for achieving, even if a power status transition loop occurs, an operable state in accordance with an event policy that can interrupt the loop.

The present invention has the following configuration.

An aspect of the present invention is an information processing apparatus including: a power log unit configured to record, in a log, that power status change has been performed; a sensing unit configured to sense that an event has occurred; a detection unit configured to reference the log and detect a loop of power status transition, if a sensed event is an event which is a target of an event policy to change power status with an occurrence of the event as a trigger; a deactivation unit configured to deactivate a change of power status due to the event policy, if the loop of the power status transition is detected; and a status change unit configured to change power status in accordance with the event policy, if the loop of the power status transition is not detected.

According to the present invention, regarding an event policy set from the outside, an information processing apparatus can interrupt a power status transition loop, i.e., an occurrence of the same event as a result of causing the power status to transition with an occurrence of a set event as a trigger.

Further features of the present invention will become apparent from the following description of exemplary embodiments with reference to the attached drawings.

BRIEF DESCRIPTION OF THE DRAWINGS

FIG. 2 is a diagram showing a software configuration.

FIGS. 3A to 3F are diagrams showing a database configuration in Embodiment 1.

FIG. 4 is a flowchart at the time of registering an event policy in Embodiment 1.

DESCRIPTION OF THE EMBODIMENTS

Hereinafter, modes for carrying out the present invention will be described with reference to the drawings.

Embodiment 1

System Configuration

An embodiment according to the present invention will be described. In the following description of the present embodiment, an MFP, i.e., a digital multi-function printer will be taken as an example of an information processing apparatus (network device). Note that the information processing apparatus may be a device other than an MFP, such as a printer or a facsimile. Also, the description will be given, taking an application server as an example of a management apparatus that manages the information processing apparatus. The invention in the present embodiment is applicable to any electronic device for which an event policy to cause power control status to transition in accordance with an event occurrence can be set, even if the electronic device is not connected to a network. However, an MFP connected to a network will be described as an example.

Figure 1:
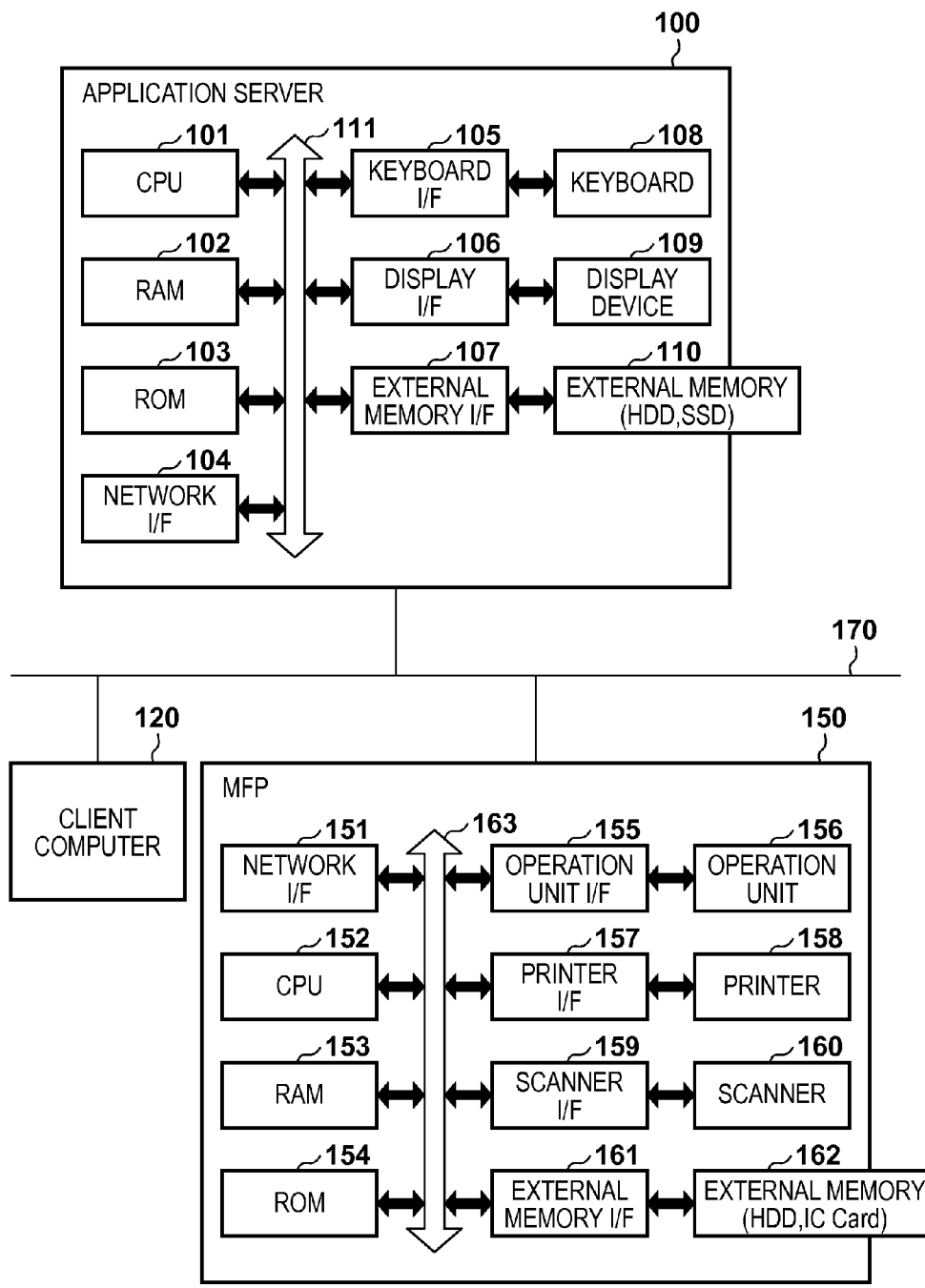
FIG. 1 is a diagram showing a system configuration and a hardware configuration.

FIG. 1 is a block diagram illustrating a system configuration and a hardware configuration of a management system that manages the information processing apparatus in the present embodiment. The management system is constituted by an application server 100 connected by a network 170, a client computer 120, and an MFP 150. Note that the application server 100 and the client computer 120 have a configuration of a general computer. Since the hardware configuration of the client computer 120 is similar to that of the application server 100, a description thereof will be omitted.

In the application server 100, a CPU 101 executes processing based on an application program or the like stored in a ROM 103 or an external memory 110. Furthermore, the CPU 101 comprehensively controls each device connected to a system bus 111. The CPU 101 also opens various registered windows based on a command given by a mouse cursor (not shown) or the like on a display device 109, and executes various kinds of data processing. A RAM 102 functions as a main memory, a work area, or the like of the CPU 101. The ROM 103 is a read-only memory functioning as an area for storing a basic I/O program or the like. The ROM 103 or the external memory 110 stores an operating system program (hereinafter, "OS"), which is a control program of the CPU 101, or the like. Furthermore, the ROM 103 or the external memory 110 stores files and other various data that are used in processing based on the aforementioned application program or the like. A network I/F 104 is connected to the network 170 and performs network communication. A keyboard I/F 105 controls input from a keyboard 108 or a pointing device (not shown). A display I/F 106 controls display of the display device 109. An external memory I/F 107 controls access to the external memory 110 such as a hard disk drive (HDD) and/or a solid state drive (SSD). The external memory 110 stores a boot program, various applications, user files, edit files, and/or the like. The application server 100 operates in a state where the CPU 101 is executing the basic I/O program and the OS that are written in the ROM 103 and/or the external memory 110. The basic I/O program is written in the ROM 103, and the OS is written in the ROM 103 or the external memory 110. When the power of the computer is turned on, the OS is loaded into the RAM 102 from the ROM 103 or the external memory 110 by means of an initial program loading function in the basic I/O program, and an operation of the OS is started. Reference numeral 111 denotes a system bus, which connects the devices to one another.

In the MFP 150, a network I/F 151 is connected to the network 170 and performs network communication. A CPU 152 outputs an image signal serving as output information to a printer 158 via a printer I/F 157 connected to a system bus 163, based on a control program or the like. Note that the control program is stored in a ROM 154, an external memory 162, or the like. The CPU 152 can perform processing for communicating with the computer via the network I/F 151, and is configured to be able to notify the application server 100 of information in the MFP 150 or the like. Furthermore, the CPU 152 executes processing based on an application program or the like stored in the ROM 154 or the external memory 162. A RAM 153 functions as a main memory, a work area, and/or the like of the CPU 152, and is configured to be able to expand the memory capacity using an optional RAM connected to an expansion port (not shown). Note that the RAM 153 is used as an output information deployment area, an environment data storage area, an NVRAM, or the like. The ROM 154 or the external memory 162 such as an HDD stores a control program of the CPU 152, an application program, font data used when generating the aforementioned output information, information used in the MFP 150, or the like. An operation unit I/F 155 serves as an interface connected to an operation unit 156, and outputs image data to be displayed to the operation unit 156. The operation unit I/F 155 also receives information that a user inputs via the operation unit 156. The operation unit 156 corresponds to an operation panel or the like in which a switch for operations, an LED display, and the like are provided. The printer I/F 157 outputs an image signal serving as output information to the printer 158 (printer engine). A scanner I/F 159 receives an image signal as input information from a scanner 160 (scanner engine). An external memory I/F (memory controller) 161 controls access to the external memory 162 such as a hard disk drive (HDD) or an IC card. The number of aforementioned external memory is not limited to one, and a configuration may be employed in which at least one external memory is provided and a plurality of external memories can be connected. Furthermore, a configuration is also possible in which an NVRAM (not shown) is provided, and printer mode setting information from the operation unit 156 is stored therein. A system bus 163 connects the devices to one another.

Software Configuration of Application Server

FIG. 2 is a block diagram illustrating a software configuration of the management system that manages the information processing apparatus in the present embodiment. A software configuration of the application server 100 will be described first. In the application server 100, a management application 202 and modules thereof exist as files saved in the external memory 110. These are program modules that are loaded, when being executed, into the RAM 102 and executed by the OS or modules that use these program modules. The management application 202 can be installed to the HDD or the SSD of the external memory 110 additionally via a CR-ROM (not shown) of the external memory 110 or the network 170. A network module 200 performs communication with the client computer 120 and the MFP 150 via the network 170, using any communication protocol. A Web server service module 201 provides a service of returning an HTTP response upon receiving an HTTP request from a Web browser 221 of the client computer 120. As an example of the HTTP response to be returned, Web page data saved in the external memory 110 may be returned. Alternatively, a request to generate an HTTP response may be given to a UI module 203 in the management application 202.

The management application 202 is an application that manages the MFP 150 connected to the application server 100 via the network 170. The management application 202 is implemented as a program that executes processing in response to a request given to a Web page provided by the Web server service module 201, for example. As described above, the management application 202 achieves, together with the Web server service module 201, a Web application that manages the MFP 150. In the management application 202, the UI module 203 generates an HTTP response in accordance with a request from the Web server service module 201. The UI module 203 also receives user input information transmitted from the Web browser 221 of the client computer 120, and calls each module as necessary. Examples of the modules called by the UI module 203 include a search module 204 and a power management module 205. Of course the UI module 203 may call other modules. The search module 204 searches for the MFP 150 connected to the application server 100 via the network 170, using predetermined communication protocol. Examples of the communication protocol used for the search by the search module 204 include SNMP (Simple Network Management Protocol), SLP (Service Location Protocol), and the like. The search module 204, upon finding the MFP 150, acquires device information from the MFP 150 and stores the information in a management table 300 of a later-described database server service module 210.

The power management module 205 manages power status of the MFP 150. The power status includes, for example, a power-on state where the power is supplied to the entire device, a power-off (shutdown) state where the power is not at all supplied to the entire device, a standby state where the power is supplied to the RAM 153, which is volatile, and is not supplied to other parts, a state where the power is supplied to a circuit of a control unit but is not supplied to the printer 158, a state where the power is supplied only to the CPU 152, and the like. The power management module 205 is constituted by a power control module 206, a power setting management module 207, a power status notification receiving module 208, and a power log management module 209. The power control module 206 performs comprehensive control for appropriately calling the power setting management module 207, the power status notification receiving module 208, or the power log management module 209 in response to a request from the UI module 203. The power control module 206 also performs, via the network module 200, communication relating to power control with the MFP 150 connected to the application server 100 via the network 170. Note that any communication protocol is used in the communication relating to power control with the MFP 150. Examples of the communication protocol used by the power control module 206 include SNMP(Simple Network Management Protocol)/PowerMIB, and the like. The power setting management module 207 is a module that manages a power setting, such as an event policy, to be distributed to the MFP 150. The power setting management module 207 stores the managed event policy in an event policy management table 301 in the later-described database server service module 210. The power status notification receiving module 208 receives a notification relating to the power status from the MFP 150. Examples of the notification relating to the power status received by the power status notification receiving module 208 include a Trap notification and an Inform notification in the SNMP. The power status notification receiving module 208 stores the received power status notification in a power status notification management table 304 in the later-described database server service module 210. The power log management module 209 manages a power status transition log acquired from the MFP 150. The power log management module 209 stores the managed power status transition log in a power log management table 305 in the later-described database server service module 210. The database server service module 210 manages data, and stores and retrieves the data in accordance with a request from other modules. The database server service module 210 may be provided on a device other than the application server 100, as long as the database server service module 210 can be accessed from the management application 202.

Database Configuration of Application Server

An exemplary table configuration in the database server service module 210 is shown in FIGS. 3A to 3F. Note that the table configuration in FIGS. 3A to 3F are only an example, and a table configuration different from this example may be employed. A management table 300 shown in FIG. 3A is a table that stores information regarding the MFP 150 managed by the management application 202. The information stored in the management table 300 includes an identifier (device ID) 3001 of the information processing apparatus, a device name 3002, a model name 3003, a firmware (FW) version 3004, an IP address 3005, a serial number 3006, last update date and time 3006, and the like, for example. Here, the identifier of the information processing apparatus is an identifier for uniquely identifying the MFP 150, and the last update date and time indicate the update date and time when the record is last updated with information acquired from the MFP 150.

The event policy management table 301 shown in FIG. 3B is a table that stores a setting of event policies to be distributed to the MFP 150. The information stored in the event policy management table 301 includes an event policy identifier (event policy ID) 3011, event request power status 3012, an event name 3013, event policy status 3014, and the like, for example. Here, the event policy identifier 3011 is an identifier for uniquely identifying each event policy. The event request power status 3012 is power status requested when each event occurs, and corresponds to powEventRequestPowerState in the PowerMIB. The event name 3013 is an event name to be a target of each event policy, and corresponds to powEventName in the PowerMIB. The event policy status 3014 is information indicating status of each event policy, and corresponds to powEventRowStatus in the PowerMIB.

The task management table 302 shown in FIG. 3C is a table that stores information of tasks of distributing event policies to the MFP 150. The information stored in the task management table 302 includes a task identifier 3021, execution time 3022, task status 3023, and the like, for example. Here, the task identifier 3021 is an identifier for uniquely identifying each task, and the task status 3023 is information indicating task execution status such as waiting, under execution, and execution completed.

The task associating management table 303 shown in FIG. 3D is a table that stores information for associating task execution target devices with distribution target event policies. The information stored in the task associating management table 303 includes a task identifier (task ID) 3031, an information processing apparatus identifier (device ID) 3032, an event policy identifier (event policy ID) 3033, and the like, for example.

The power status notification management table 304 shown in FIG. 3E is a table that stores information of a power status notification relating to a status change of each event policy received from the MFP 150. The information stored in the power status notification management table 304 includes a notification identifier (notification ID) 3041, an information processing apparatus identifier (device ID) 3042, a notification type 3043, a time stamp 3044, event request power status 3045, an event name 3046, event policy status 3047, and the like, for example. Here, the notification identifier 3041 is an identifier for uniquely identifying each power status notification, and the information processing apparatus identifier 3042 is an identifier for uniquely identifying each MFP 150 that is a notification transmission source. The notification type 3043 is information relating to a type of each power status notification, and for example, in the case of the PowerMIB, information of a Trap notification, an Inform notification, or the like is stored. The time stamp 3044 is time information indicating the date and time when the status of each notification target event policy has changed. The event request power status 3045 is information of power status that is associated with each notification target event policy and is requested when an event occurs, and corresponds to powEventRequestPowerState in the PowerMIB. The event name 3046 is information of an event name that is associated with each notification target event policy and is to be a target of the event policy, and corresponds to powEventName in the PowerMIB. The event policy status 3047 is information indicating the status of each notification target event policy, and corresponds to powEventRowStatus in the PowerMIB.

The power log management table 305 shown in FIG. 3F is a table that accumulates and stores power status transition logs acquired from the MFP 150, and the power log management table 305 itself is a log indicating the history of the power status transition in network devices (e.g., MFPs) under the management of the application server 100. The information in each record of the power log management table 305 includes a log identifier (log ID) 3051, an information processing apparatus identifier (device ID) 3052, logged power status 3053, a logged power status message 3054, logged power status date and time 3055, a logged component type 3056, a logged component reference identifier 3057, and the like, for example. Here, the log identifier 3051 is an identifier for uniquely identifying each power log, and the information processing apparatus identifier 3052 is an identifier for uniquely identifying each MFP 150 that is a notification transmission source. The logged power status 3053 indicates the power status recorded in each log, and corresponds to powLogPowerState in the PowerMIB. The logged power status message 3054 indicates a message for describing the power status recorded in each log, and corresponds to powLogPowerStateMessage in the PowerMIB. The logged power status date and time 3055 indicate the date and time of transition to the power status recorded in each log, and corresponds to powLogPowerStateDateAndTime in the PowerMIB. The logged component type 3056 indicates the type of a component subjected to a power status change recorded in each log, and corresponds to powLogComponentType in the PowerMIB. The logged component reference identifier 3057 is an identifier for referencing the component subjected to a power status change recorded in each log, and corresponds to powLogComponentReferenceId in the PowerMIB.

Next, a software configuration of the client computer 120 will be described. Note that each module constituting the client computer 120 is a program module existing as a file saved in the ROM 103 or the external memory 110. When each module is executed, the module is loaded into the RAM 102 and executed by the OS or a module that uses this module. A network module 220 performs network communication with the application server 100 and the MFP 150, using any communication protocol. The Web browser 221 transmits an HTTP request message via the network module 220, and receives and displays an HTTP response message. The client computer 120 accesses the application server 100 through the Web browser 221.

Software Configuration of MFP

Subsequently, a software configuration of the MFP 150 will be described. In the MFP 150, various modules exist as files saved in the ROM 154 or the external memory 162, loaded into the RAM 153 at the time of execution, and then executed. A network module 230 performs communication with the application server 100 and the client computer 120 via the network 170, using any communication protocol. A status management module 231 manages the status regarding whether an error has occurred in the MFP 150, whether printing/scanning can be performed, and the like.

A power management module 232 manages power status of the MFP 150 in conjunction with the status management module 231. The power management module 232 is constituted by a power control module 233, a power setting management module 234, a power status notification transmission module 235, and a power log management module 236. The power control module 233 performs comprehensive control for appropriately calling the power setting management module 234, the power status notification transmission module 235, or the power log management module 236, in accordance with a request from the network module 230 or a later-described UI module 237. The power control module 233 also mediates, via the network module 230, communication relating to power control between the MFP 150 and the application server 100 connected via the network 170. Note that any communication protocol is used in the communication relating to power control with the application server 100. Examples of the communication protocol used by the power control module 233 include SNMP/PowerMIB and the like. Reference numeral 234 denotes the power setting management module, which is a module that manages power settings such as an event policy distributed from the application server 100. The power status notification transmission module 235 transmits a notification relating to power status to the application server 100. Examples of the notification relating to the power status transmitted by the power status notification transmission module 235 include a Trap notification and an Inform notification in the SNMP. The power status notification transmission module 235 also manages notification destination information. The power log management module 236 creates and manages a power status transition log every time the power status transitions. The power status transition log has substantially the same content as the power status management log 305 shown in FIG. 3F, whereas it is different from the power status management log 305 in that the log ID need only be unique to the MFP 150 and the device ID is unnecessary.

The UI module 237 renders a UI displayed on the operation unit 156 of the MFP 150, and receives a user input value that is input by a UI operation by a user on the operation unit 156. The UI module 237 also functions as an operation log recording unit that records the history relating to an operation as UI operation history in a UI operation log, when the UI is operated. Information to be recorded includes at least the date and time of the operation. Furthermore, the information to be recorded may include an ID of the user who performed the operation, the function to be a target of the operation, and the like.

Processing for Distributing and Registering Event Policy

Next, a description will be given, using FIG. 4, of operations of the application server 100 and the MFP 150 when the MFP 150 receives an event policy distributed by the application server 100. In step S400, the power control module 206 in the application server 100 acquires an event policy from the power setting management module 207, and transmits an event policy registration request to the MFP 150. A trigger of the transmission is an instruction from a client or the like, for example. The acquisition of the event policy and the transmission of the event registration request to the MFP 150 are performed based on the task management table 302 and the task associating management table 303 in the database server service module 230. For example, if the status 3023 registered in the task management table 302 reaches the execution time 3022 of a task in a waiting state, the task ID 3031 in the task associating management table 303 corresponding to the relevant task ID 3021 is referenced. The device ID 3032 and the event policy ID 3033 of the relevant task ID are referenced, the event policy of this event policy ID is acquired, and an event policy registration request is transmitted together with the event policy (or event policy information) to the information processing apparatus having the relevant device ID.

In step S401, the network module 230 in the MFP 150 receives the event policy registration request transmitted from the application server 100, and gives the power control module 233 a request to register the event policy. In step S402, the power control module 233 acquires a registered event policy registration rejection list. In step S403, the power control module 233 determines whether or not the received event policy registration request is rejected based on the received event policy registration request and the acquired event policy registration rejection list. If it is determined that the received event policy registration request is not rejected, the processing proceeds to step S404, and if it is determined that the received event policy registration request is rejected, the processing proceeds to step S405. For example, if the event policy ID that is a registration target in the event policy registration request is registered in the event policy registration rejection list, the event policy registration request having this event policy ID is determined to be rejected. In step S404, the power control module 233 registers the event policy via the power setting management module 234. In step S405, the power control module 233 transmits an event policy registration request result to the application server 100. "Registration successful" or "registration failed" are transmitted as the event policy registration request result respectively in the case where the event policy is registered and in the case where the event policy is not registered or cannot be registered.

In step S406, the network module 200 in the application server 100 receives the event policy registration request result transmitted from the MFP 150, and gives a processing request to the power control module 206. In step S407, the power control module 206 determines whether the received event policy registration request result is that event policy registration has been successful or that event policy registration has been failed. If the result is that event policy registration has been successful, the processing proceeds to step S408, and if the result is that event policy registration has failed, the processing ends. In step S408, the power control module 206 transmits a Trap/Inform registration request for receiving an error notification at the time of executing the event policy. Here, the Trap/Inform registration request is a registration request for receiving Trap or Inform defined in the SNMP. In step S409, the network module 230 in the MFP 150 receives the Trap/Inform registration request transmitted by the application server 100, and gives a Trap/Inform registration request to the power control module 233. In step S410, the power control module 233 performs Trap/Inform registration via the power status notification transmission module 235. By performing the Trap/Inform registration, in this example, Trap or Inform is transmitted to the application server 100, with an occurrence of a power status transition loop as a trigger.

Procedure at the Time of Event Occurrence

Subsequently, operations of the MFP 150 at the time when an event occurs in the MFP 150 will be described using FIG. 5. In step S500, the status management module 231 in the MFP 150 checks whether or not an event such as an error has occurred in the MFP 150. If an event has occurred, the processing proceeds to step S501, and if not, the processing in step S500 is periodically repeated. The procedure from step S501 may be started by an interruption with an event occurrence as a trigger. In step S501, the status management module 231 notifies the power control module 233 of the event occurrence, and the power control module 233 that is notified of the event occurrence acquires a registered event policy via the power setting management module 234. The event policy to be acquired can be determined by referencing the event policy management table 301. A registered event policy whose event policy status 3014 is a service stop state (notinservice) is not acquired. In step S502, the power control module 233 determines whether or not an event policy associated with the event that has occurred is registered. If it is determined that an event policy associated with the event that has occurred is registered, the processing proceeds to step S503, and if not registered, the processing ends.

In step S503, the power control module 233 acquires, via the power log management module 236, the power status transition log that the power status management module 236 locally manages within the MFP 150. In step S504, the power control module 233 acquires the UI operation log via the UI module 237. In step S505, the power control module 233 determines whether or not repetition (loop) of the same power status transition pattern has occurred, based on the acquired power status transition log. For example, the loop determination can be performed by searching for a repetition pattern of the logged power status in a plurality of continuous records including the latest power log record (i.e., a record indicating the current power status). Of course not only the power status but also a component (indicated by the logged component type 3506) of this power status or the like may be included. The search range may be records recorded within the time that is double a predetermined time referenced in step S506 from the current time, for example. If a repetition pattern of the logged power status is found, it is determined that a loop has occurred. If a loop has occurred, the processing proceeds to step S506, and if a loop has not occurred, the processing proceeds to step S513.

In step S506, the power control module 233 determines whether or not the occurring power status transition loop is transition that has occurred within the predetermined time. This determination can be performed by determining whether a time difference between the latest logged power status date and time and the oldest logged power status date and time included in a record group constituting the loop including the latest record is within the predetermined time, i.e., by determining whether the repetition period is equal to or shorter than the predetermined time, for example. However, if the power log search range in step S305 is limited to the time that is double the predetermined time, the processing may skip step S506 and be branched to step S508. If it is determined that the power status transition loop is transition that has occurred within the predetermined time, the processing proceeds to step S507. On the other hand, if the power status transition loop has occurred after a lapse of the predetermined time or longer, it is determined that this event policy does not need to be deactivated, and the processing proceeds to step S513. In step S507, the power control module 233 determines whether a UI operation is interposed during the transition in the occurring power status transition loop. This determination can be performed by searching the UI operation log for a UI operation performed between the latest logged power status date and time and the oldest logged power status date and time included in the record group constituting the loop including the latest record, for example. If a relevant record is found in the UI operation log, it can be determined that a UI operation is interposed during the status transition in the power status transition loop. If it is determined that a UI operation is not interposed during the transition in the power status transition loop, the processing proceeds to step S508. On the other hand, if it is determined that a UI operation is interposed during the transition in the power status transition loop, it is determined that the event policy does not need to be deactivated, and the processing proceeds to step S513. In step S508, the power control module 233 determines whether or not the occurring power status transition loop increases the amount of power consumption of the MFP 150. This determination can be performed based on the logged power status corresponding to the oldest logged power status date and time and the logged power status corresponding to the latest logged power status date and time included in the record group constituting the loop including the latest record, for example. If the power consumption in the latter power status is larger than the power consumption in the former power status, it can be determined that the occurring power status transition loop increases the amount of power consumption. Alternatively, for example, the duration time of each power state constituting the loop may be determined based on the power status date and time, and it may be determined that the loop increases the amount of power consumption if the duration time of a power state with the largest amount of power consumption is longest. Note that step S508 does not necessarily have to be performed. If it is determined that the power status transition loop increases the amount of power consumption, the processing proceeds to step S509. On the other hand, if it is determined that the power status transition loop does not increase the amount of power consumption, it is determined that the event policy does not need to be deactivated, and the processing proceeds to step S513.

Figure 6:
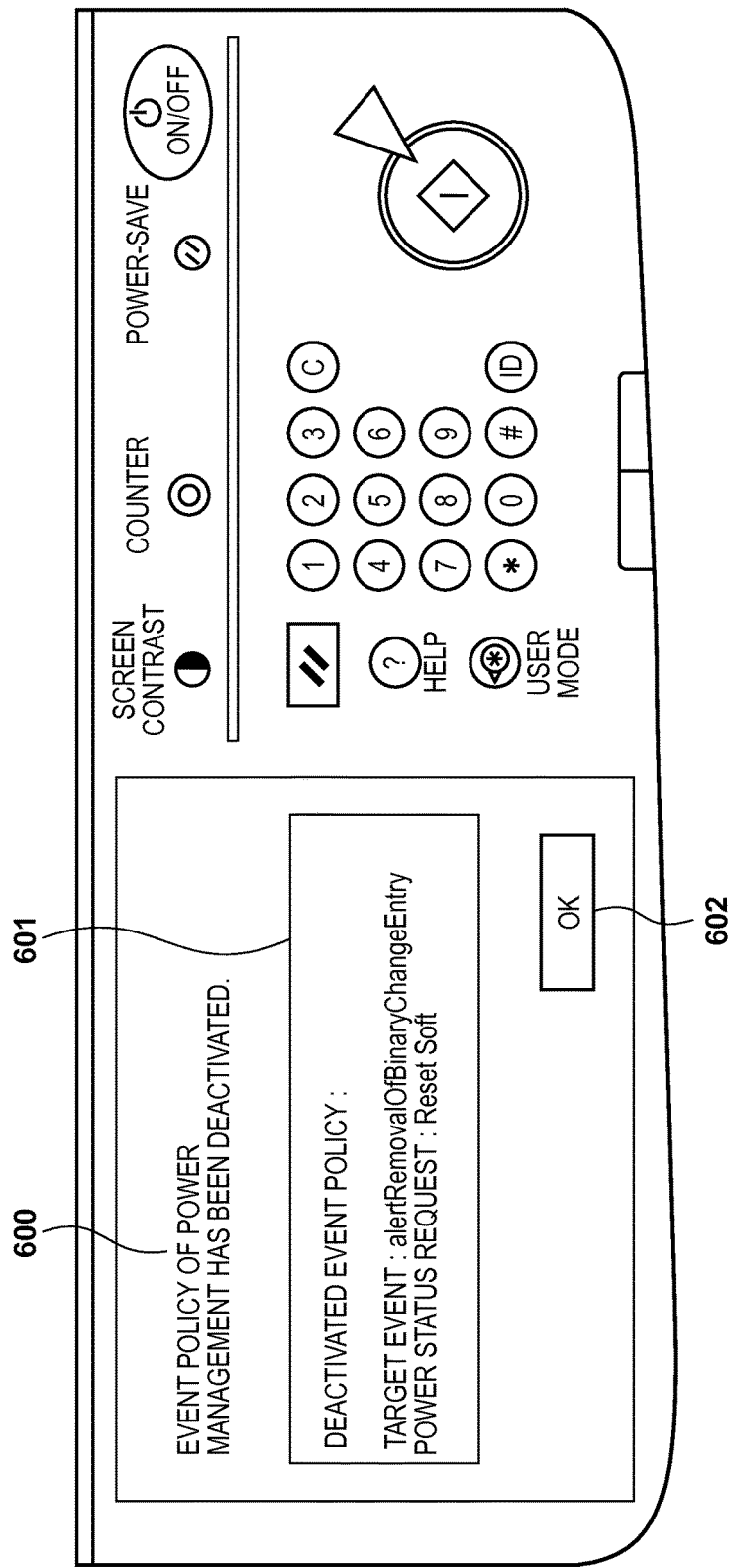
FIG. 6 is a diagram showing an exemplary screen displaying an event policy deactivation warning in Embodiment 1.

In step S509, the power control module 233 deactivates the registered event policy via the power setting management module 234. As a method for deactivating the event policy, for example, an entry of powEvent in the PowerMIB may be entirely deleted. Alternatively, the event policy may be deactivated by setting powEventRowStatus in a powEvent entry to a state indicating that the event policy is not active, such as "notInService". In any case, the currently registered event policy is deactivated by deleting it or setting it to a state indicating that the event policy is inactive, for example. In step S510, the power control module 233 adds the deactivated event policy to the event policy registration rejection list such that this event policy cannot be subsequently registered. In step S511, the power control module 233 displays, on the UI, a warning message indicating that the event policy has been deactivated, via the UI module 237. An exemplary screen displaying the warning message indicating the event policy deactivation on the UI is shown in FIG. 6. An event policy deactivation warning message 600 and an event policy deactivation warning message details 601 are displayed as a user interface. As an exemplary display of the event policy deactivation warning message details 601, information of a target event name and the power status request of the deactivated event policy is displayed in FIG. 6. The target event name displayed on the UI corresponds to powEventName in the PowerMIB, and the power status request corresponds to powEventRequestPowerState in the PowerMIB. These can also be obtained from the event name 3013 and the event request power status 3012 in the record corresponding to the deactivated event policy in the event policy management table 301. Upon an OK button 602 on the UI in FIG. 6 being clicked, the event policy deactivation warning message display screen is closed.

In step S512, the power control module 233 transmits a Trap/Inform notification for notifying the application server 100 that the event policy has been deactivated. The Trap/Inform notification is transmitted via the power status notification transmission module 235, and is transmitted to the MFP 150 that is a Trap/Inform notification destination registered in the power status notification transmission module 235. On the other hand, in step S513, the power control module 233 changes the power status of the MFP 150 in accordance with the event policy. Also, the power log management module 236 additionally records the power status after the change in the power log. Note that this recording of the power log is not limited to step S513, and if the power status has changed, this change is always recorded. That is to say, not only if an event policy target event has occurred, but also if the power status has changed in other cases, the change of the power status is recorded in the power log.

Event Policy Deactivation Processing Performed by Application Server

Next, a description will be given, using FIG. 7, of operations of the application server 100 when receiving the Trap/Inform notification indicating event policy deactivation transmitted from the MFP 150 in step S512. In step S700, the network module 200 receives the Trap/Inform notification transmitted from the MFP 150, and gives a processing request to the power control module 206. In step S701, the power control module 206 determines whether to deactivate the event policy in a management target device other than the MFP 150 that is the Trap/Inform notification transmission source. Regarding the determination of whether to deactivate the event policy, a UI screen may be displayed to prompt the user to select processing to be executed, and the determination may be performed based on a user input result, for example. FIG. 8 shows an exemplary UI screen for selecting whether to execute event policy deactivation. In an event policy deactivation execution selection message 800, buttons 801 and 802 for selecting whether to execute the event policy deactivation are displayed on the screen. If an application button (i.e., YES button) 801 is clicked, the power control module 206 determines in step S701 that the event policy is also to be deactivated in a management target device other than the MFP 150 which is the Trap/Inform notification transmission source, and the processing proceeds to step S702. If a non-application (i.e., NO button) 802 is clicked, the power control module 206 determines in step S701 that the event policy is not to be deactivated in a management target device other than the MFP 150 which is the Trap/Inform notification transmission source, and the processing ends. In step S702, the power control module 206 acquires information regarding the management target device from the management table 300 in the database server service module 210. In step S703, the power control module 206 transmits an event policy deactivation request to a managed MFP 150 other than the MFP 150 that is the Trap/Inform notification transmission source. Each device that receives the request deactivates a designated event policy, as in step S509 in FIG. 5.

Figure 5:
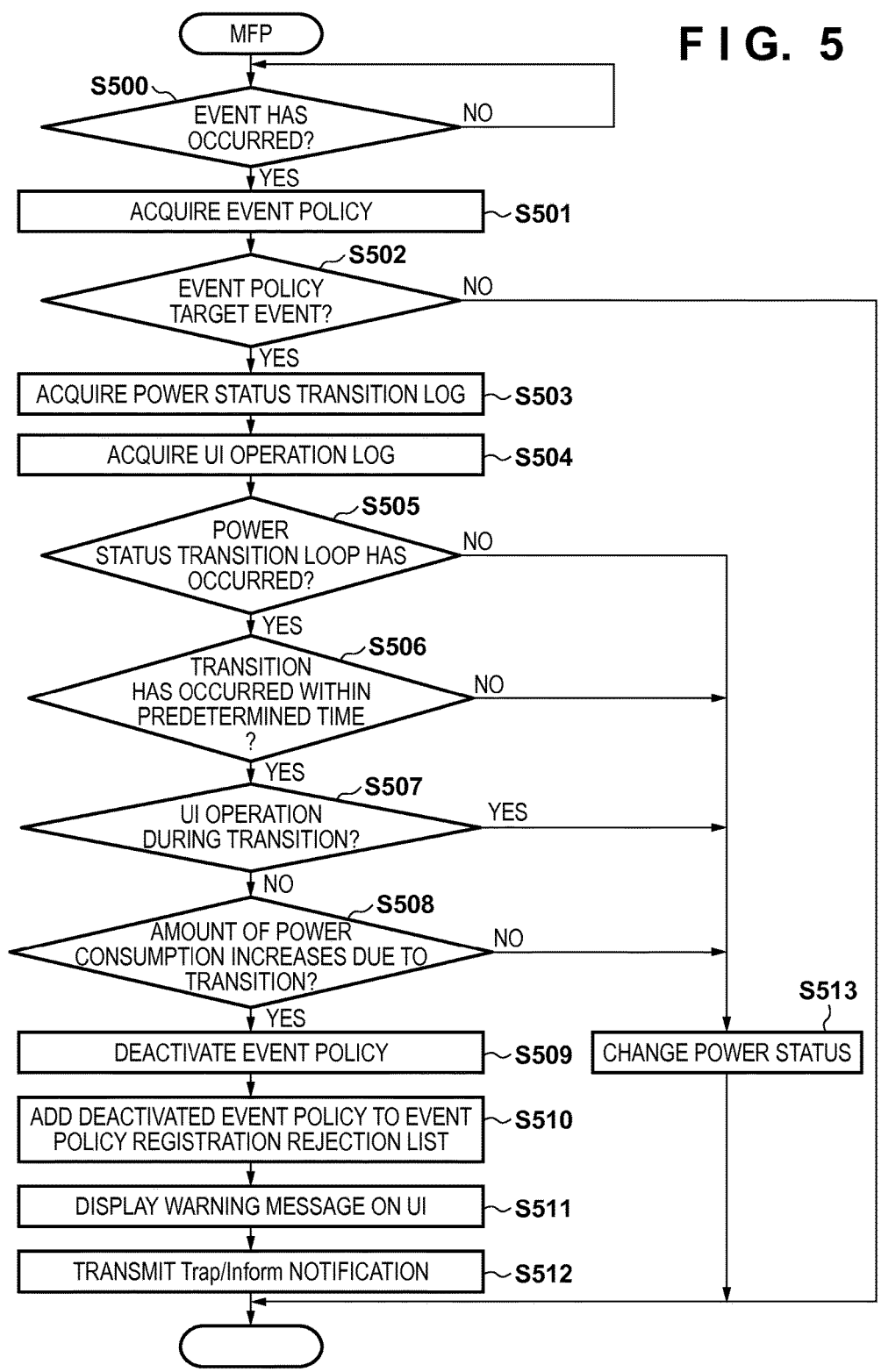
FIG. 5 is a flowchart at the time of an event occurrence in Embodiment 1.
Figure 7:
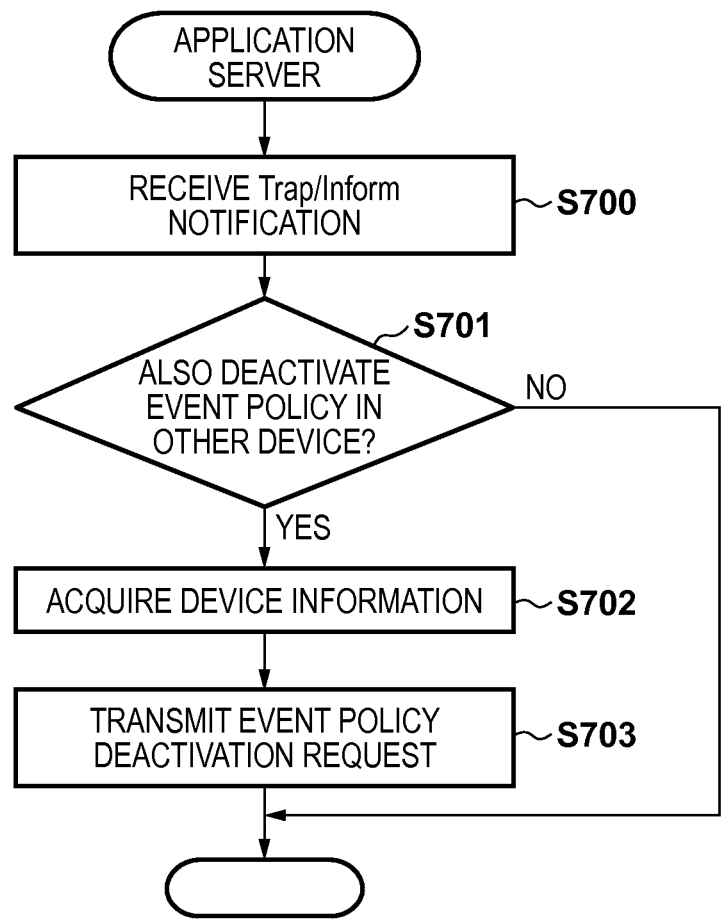
FIG. 7 is a flowchart at the time of receiving an event policy deactivation notification in Embodiment 1.
Figure 8:
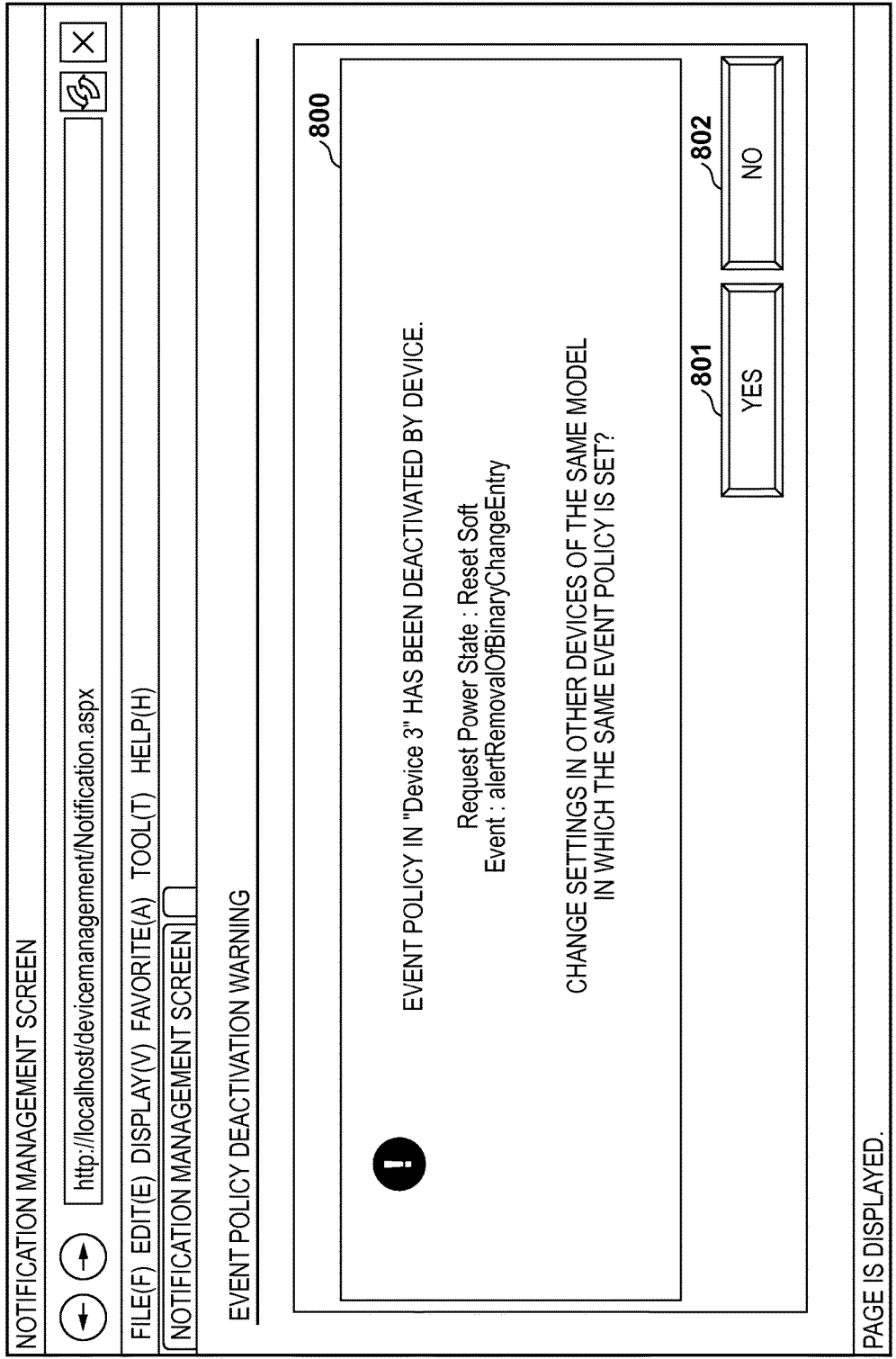
FIG. 8 is a diagram showing an exemplary screen displaying an event policy deactivation warning in Embodiment 1.

Note that, although FIGS. 5 and 7 illustrate processing up to deactivation of the event policy after sensing the power status transition loop in the MFP 150, if a cause of an occurrence of the power status transition loop can be specified, processing for resolving the power status transition loop may be performed as post-processing. As the power status transition loop resolution processing, updating of firmware of the MFP 150 when a specific error occurs is assumed, for example. Regarding selection of a target MFP 150 to which the event policy deactivation request is to be transmitted, all managed MFPs 150 other than the MFP 150 that is the Trap/Inform notification transmission source may be selected, for example. Alternatively, the user may be able to select a target MFP 150 on the UI. Considering the possibility that the cause of the occurrence of the power status transition loop is a firmware bug, a configuration may be employed in which only a device of the same model as the MFP 150 that is the Trap/Inform notification transmission source, or a device having the same firmware as that of the MFP 150 that is the Trap/Inform notification transmission source can be selected.

With the above processing, regarding the event policy set from the outside, the MFP 150 can avoid a repeated occurrence of the power status transition loop with an occurrence of the set event as a trigger. The application server 100 that receives the event policy deactivation notification from the MFP 150 can collectively set deactivation of the event policy such that a similar loop will not occur in the other managed MFPs 150.

Note that, although a loop is detected from power status transition recorded in the log in the present embodiment, a loop may be detected while paying particular attention only to power status transition due to an event policy recorded in the log. In this case, the ID of the event policy that has caused the power status transition is also recorded in the log. If the power status transition is not due to an event policy, the entry thereof may be left blank. Then, in step S505, a loop is searched for using, as a repetition pattern search target, a record group in which continuous power status transition due to an event policy is recorded in the power log. By doing so, a loop caused by an event policy can be detected while a record in which power status transition that is not due to an event policy is recorded is not included in the detected power status transition loop. Since it is considered that power status transition other than that due to a power switch operation is mostly due to an event policy, the possibility is eliminated that the power status transition due to a power switch operation is detected by error as a power status transition loop caused by an event policy. Alternatively, the power status transition to be recorded in the log may be limited to that due to an event policy. That is to say, the power log is recorded only in step S513 in FIG. 5. By doing so, only the power status transition due to an event policy is recorded in the log, and accordingly a power status transition loop caused by an event policy can be searched for in all records in the log.

Embodiment 2

The present embodiment will describe a method for dynamically switching the method for deactivating an event policy, in accordance with the degree of a power status transition loop with an occurrence of an event set in an event policy as a trigger.

A system configuration, a hardware configuration, and a software configuration of a management system that manages an information processing apparatus in the present embodiment are similar to those in FIGS. 1 and 2 in Embodiment 1, and accordingly a description thereof will be omitted. A configuration of tables in a database in the management apparatus is also similar to that in FIGS. 3A to 3F in Embodiment 1, and accordingly a description thereof will be omitted. Operations of the application server 100 and the MFP 150 when the MFP 150 receives the event policy distributed by the application server 100 are also similar to those in FIG. 4 in Embodiment 1, and accordingly a description thereof will be omitted.

Figure 9:
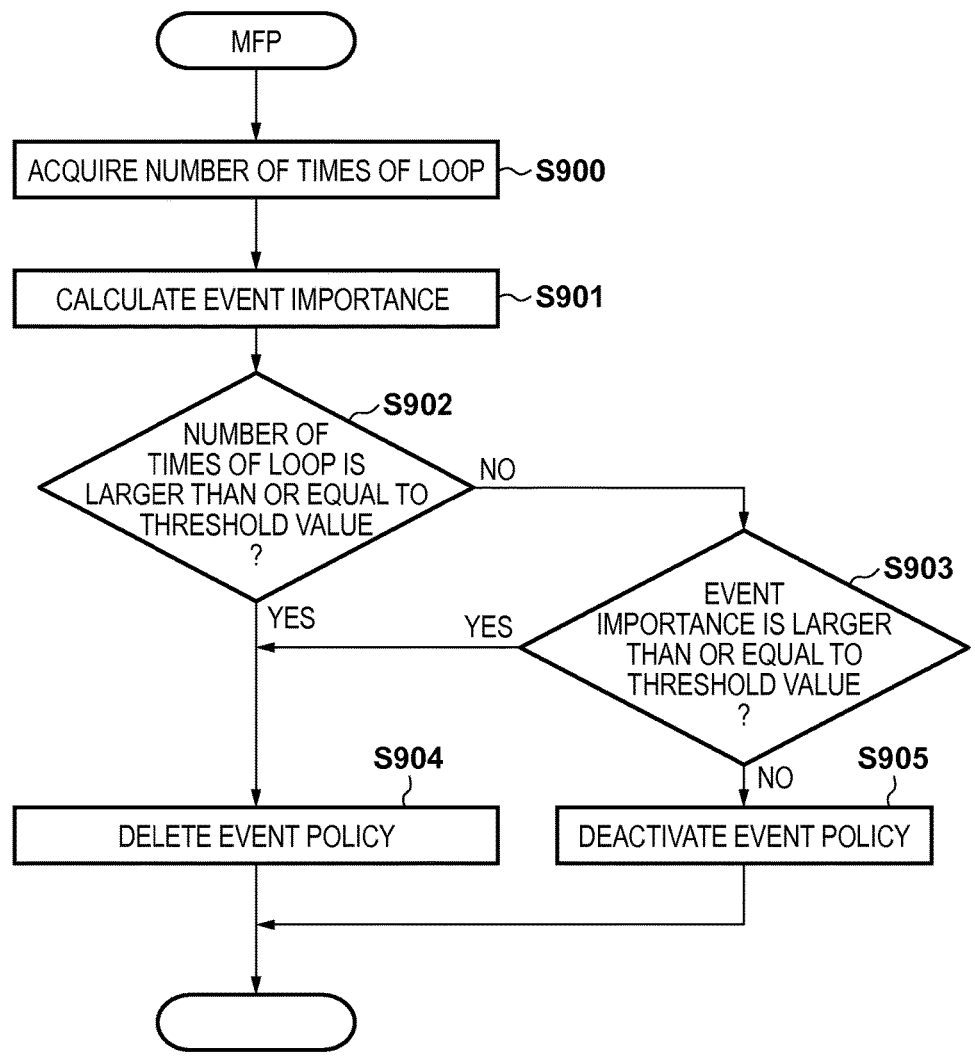
FIG. 9 is a flowchart at the time of deactivating an event policy in Embodiment 2.

A detailed description will now be given, using FIG. 9, of processing by which the power control module 233 deactivates the event policy in step S509 in FIG. 5 in Embodiment 1 during the operations of the MFP 150 when an event has occurred therein. Note that the content of processing other than step S509 in FIG. 5 is similar to the content described in Embodiment 1, and accordingly a description thereof will be omitted. Note that, when the loop determination is performed in step S505, the overall power log may be set as the repetition pattern search range, but it is preferable to limit the search range, in terms of processing time and the burden. In this case, the repetition pattern search range is set at least from the latest log to the time obtained by multiplying the predetermined time referenced in step S506 in FIG. 5 by the number of times of the loop referenced in step S902 in FIG. 9.

In step S900, the power control module 233 acquires the number of times that repetition (loop) of a transition pattern in the same power status has occurred. In step S901, the power control module 233 calculates the importance of the event that has occurred. Regarding the method for calculating the importance of the event, the priority of the event may be defined and a numeric value may be then calculated based on the defined priority, or a numeric value may be dynamically calculated in accordance with the frequency of the event occurrence. In step S902, the power control module 233 determines whether or not the number of times of the power status transition loop is larger than or equal to a threshold value. If the number of times of the power status transition loop is larger than or equal to the threshold value, the processing proceeds to step S904, and if not larger than or equal to the threshold value, the processing proceeds to step S903. In step S903, the power control module 233 determines whether or not the importance of the event that has occurred is larger than or equal to a threshold value. If the importance of the event is larger than or equal to the threshold value, the processing proceeds to step S904, and if not larger than or equal to the threshold value, the processing proceeds to step S905. In step S904, the power control module 233 deletes an entry of the registered event policy via the power setting management module 234. As a method for deleting the entry of the event policy, for example, a powEvent entry is entirely deleted in the case of the PowerMIB. On the other hand, in step S905, the power control module 233 sets the registered event policy to an inactive state, via the power setting management module 234. As a method for updating the event policy status, in the case of the PowerMIB, powEventRowStatus in a powEvent entry is changed to "notInService", for example.

With the above processing, the entry of the event policy itself is deleted if the occurrence frequency of the power status transition loop with an occurrence of an event set in the event policy as a trigger is high, or if the importance of the event that has occurred is high. On the other hand, if the occurrence frequency of the power status transition loop is low, and if the importance of the event that has occurred is also low, the event policy is deactivated while the entry of the event policy itself is left.

As described above, by dynamically switching the event policy deactivation method in accordance with the degree of the power status transition loop, an event policy regarding which an occurrence of a loop has a significant influence is deleted, and an event policy regarding which the influence of an occurrence of a loop is small can be easily activated again.

Embodiment 3

The present embodiment will describe a method for sensing an occurrence of a power status transition loop with an event policy as a trigger and performing the event policy deactivation processing, not on the information processing apparatus side but on the management apparatus side, i.e., the application server 100 side.

A system configuration, a hardware configuration, and a software configuration of a management system that manages an information processing apparatus in the present embodiment are similar to those in FIGS. 1 and 2 in Embodiment 1, and accordingly a description thereof will be omitted. A configuration of tables in a database in the management apparatus is also similar to that shown in FIGS. 3A to 3F in Embodiment 1, and accordingly a description thereof will be omitted. Operations of the application server 100 and the MFP 150 when the MFP 150 receives the event policy distributed by the application server 100 are also similar to those in FIG. 4 in Embodiment 1, and accordingly a description thereof will be omitted. However, in the present embodiment, the processing in FIG. 5 is not performed in the MFP 150. In the MFP 150, upon an event policy target event occurring, the power status is changed in accordance with a registered event policy, and a new record is recorded in the power log therewith.

Figure 10:
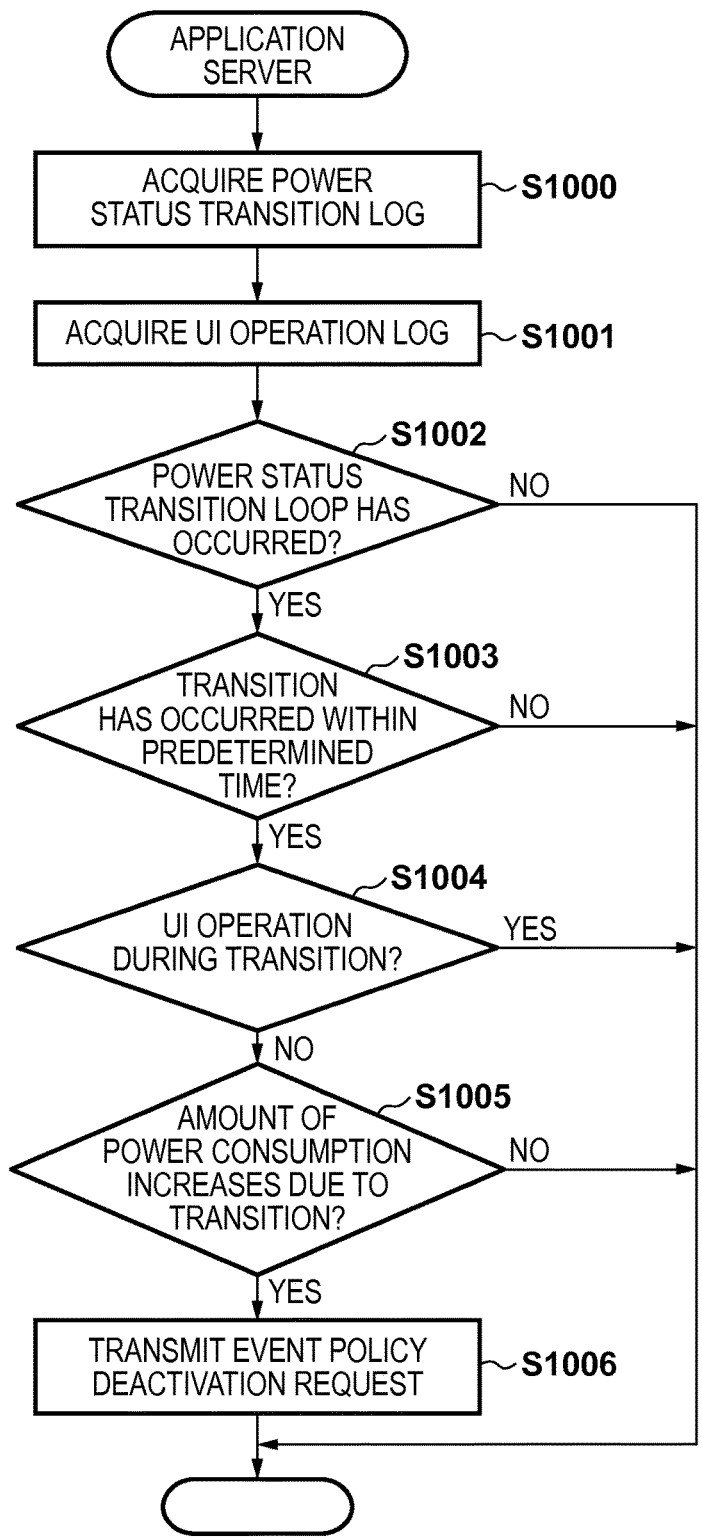
FIG. 10 is a flowchart at the time of deactivating an event policy in Embodiment 3.

A description will now be given, using FIG. 10, of operations of the application server 100 when performing processing for sensing an occurrence of a power status transition loop in the MFP 150 and deactivating the event policy registered in the MFP 150. The procedure in FIG. 10 may be periodically executed, or the MFP 150 may be caused to give a notification of an event occurrence, and the procedure in FIG. 10 may be executed in accordance with this notification.

In step S1000, the power control module 206 acquires the power status transition log from the MFP 150 via the power log management module 209. In step S1001, the power control module 206 acquires the UI operation log from the MFP 150. In any case, acquisition of only a difference record that the application server 100 does not have is sufficient. In step S1002, the power control module 206 determines whether or not repetition (loop) of the same power status transition pattern has occurred, based on the acquired power status transition log. If a loop has occurred, the processing proceeds to step S1003, and if a loop has not occurred, the processing ends. In step S1003, the power control module 206 determines whether or not the occurring power status transition loop is transition that has occurred within a predetermined time. If it is determined that the power status transition loop is transition that has occurred within the predetermined time, the processing proceeds to step S1004. On the other hand, if the power status transition loop has occurred after a lapse of the predetermined time or longer, it is determined that this event policy does not need to be deactivated, and the processing ends. In step S1004, the power control module 206 determines whether or not a UI operation is interposed during the transition in the occurring power status transition loop. If it is determined that a UI operation is not interposed during the transition in the power status transition loop, the processing proceeds to step S1005. On the other hand, if it is determined that a UI operation is interposed during the transition in the power status transition loop, it is determined that the event policy does not need to be deactivated, and the processing ends. In step S1005, the power control module 206 determines whether or not the occurring power status transition loop increases the amount of power consumption of the MFP 150. If it is determined that the power status transition loop increases the amount of power consumption, the processing proceeds to step S1006. On the other hand, if it is determined that the power status transition loop does not increase the amount of power consumption, it is determined that the event policy does not need to be deactivated, and the processing ends. In step S1006, the power control module 206 transmits, to the MFP 150, a request to deactivate this event policy.

Steps S1002 to S1005 may be performed in a manner similar to steps S505 to S508 in FIG. 5. Although step S1005 is similar to step S508 in FIG. 5, it may be performed in the same manner as in FIG. 9. In this case, the deactivation processing requested in step S1006 is either deletion or deactivation of the event policy in accordance with the event that has occurred and the number of times of the loop. In step S1006, the UI in FIG. 8 may be displayed, and the event policy may be deactivated in all management target MFPs or only in the MFP from which the loop is detected, in accordance with a user instruction.

With the above processing, it is possible to sense an occurrence of the power status transition loop with an event policy as a trigger and perform the event policy deactivation processing at the time of an occurrence of a loop, not on the information processing apparatus side but on the management apparatus side.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-119111, filed Jun. 9, 2014, which is hereby incorporated by reference herein in its entirety.

What is claimed is:

1. An information processing apparatus comprising:
   (a) a power log that records, in a log, that a power status change has been performed;
   (b) a sensing unit that senses that an event has occurred;
   (c) a detection unit that references the log and detects whether there is a loop of power status transition, if a sensed event is an event which is a target of an event policy to change power status with an occurrence of the event as a trigger;
   (d) a deactivation unit that deactivates the event policy, if the loop of the power status transition is detected; and
   (e) a status change unit that changes power status in accordance with the event policy, if the loop of the power status transition is not detected.

2. The information processing apparatus according to claim 1, further comprising a display unit,
   wherein a message indicating that the event policy has been deactivated by the deactivation unit is displayed on the display unit.

3. The information processing apparatus according to claim 1, wherein a management apparatus is notified that the event policy is deactivated by the deactivation unit.

4. The information processing apparatus according to claim 1, wherein the detection unit (a) searches the log for a repetition pattern of the power status transition, and (b) detects the repetition pattern as the loop.

5. The information processing apparatus according to claim 4, wherein, even if the repetition pattern is found, the detection unit does not detect the repetition pattern as the loop if a latest repetition period of the repetition pattern is not within a predetermined time.

6. The information processing apparatus according to claim 4, further comprising an operation log recording unit that records, in a log, an operation history of a user interface,
wherein, even if the repetition pattern is found, the detection unit references the operation history to determine whether an operation is performed during a latest repetition period of the repetition pattern, and if an operation is performed, the detection unit does not detect the repetition pattern as the loop.

7. The information processing apparatus according to claim 4, wherein, even if the repetition pattern is found, the detection unit does not detect the repetition pattern as the loop if the power status transition in the repetition pattern is a power status transition that does not increase power consumption.

8. The information processing apparatus according to claim 1, further comprising a reception unit that receives the event policy from a management apparatus and registers the received event policy,
wherein the deactivation unit registers, in a registration rejection list, an event policy to be deactivated, and
wherein if a received event policy is registered in the registration rejection list, the reception unit does not register the event policy.

9. The information processing apparatus according to claim 4, wherein, if a number of times of repetition corresponding to a repetition pattern of the power status transition detected from the log by the detection unit is larger than or equal to a predetermined threshold value, or if an importance of an event relating to the power status transition is larger than or equal to a predetermined threshold value, the deactivation unit deletes the event policy, and if not, the deactivation unit records that the event policy is inactive.

10. A non-transitory computer-readable medium that has recorded thereon a program for causing a computer to function as an information processing comprising:
(a) a power log that records, in a log, that a power status change has been performed;
(b) a sensing unit that senses that an event has occurred;
(c) a detection unit that references the log and detects whether there is a loop of power status transition, if a sensed event is an event which is a target of an event policy to change power status with an occurrence of the event as a trigger;
(d) a deactivation unit that deactivates the event policy, if the loop of the power status transition is detected; and
(e) a status change unit that changes power status in accordance with the event policy, if the loop of the power status transition is not detected.

11. A method for controlling power status of an information processing apparatus, the method comprising:
recording, in a log, that a power status change has been performed;
sensing that an event has occurred;
referencing the log and detecting a loop of power status transition, if a sensed event is an event which is a target of an event policy to change power status with an occurrence of the event as a trigger; and
deactivating the event policy, if the loop of the power status transition is detected.

12. A system comprising:
an information processing apparatus comprising (a) a power log unit that records, in a log, that a power status change has been performed, (b) a sensing unit that senses that an event has occurred, (c) a status change unit that changes power status in accordance with an event policy, and (d) a deactivation unit that deactivates the event policy in accordance with an event policy deactivation request from a management apparatus; and
a management apparatus comprising (1) an acquisition unit that acquires the log from the information processing apparatus, (2) a detection unit that references the log and detects a loop of power status transition, and (3) a transmission unit that transmits, to the information processing apparatus, a deactivation request for deactivating the event policy, if the loop of the power status transition is detected.

13. A method for controlling power status of an information processing apparatus management system, the method comprising:
recording, in a log, by an information processing apparatus, that a power status change has been performed;
sensing, by the information processing apparatus, that an event has occurred;
changing power status, by the information processing apparatus, in accordance with an event policy;
deactivating the event policy, by the information processing apparatus, in accordance with an event policy deactivation request from a management apparatus;
acquiring, by the management apparatus, the log from the information processing apparatus;
referencing, by the management apparatus, the log;
detecting, by the management apparatus, a loop of power status transition; and
transmitting, by the management apparatus, to the information processing apparatus, a deactivation request for deactivating the event policy, if the loop of the power status transition is detected, by the management apparatus.

14. A management apparatus connected to an information processing apparatus comprising (a) a power log unit that records, in a log, that a power status change has been performed, (b) a sensing unit that senses that an event has occurred, (c) a status change unit that changes power status in accordance with an event policy, and (d) a deactivation unit that deactivates the event policy in accordance with an event policy deactivation request from the management apparatus, the management apparatus comprising:
(1) an acquisition unit that acquires the log from the information processing apparatus;
(2) a detection unit that references the log and detects a loop of power status transition; and
(3) a transmission unit that transmits, to the information processing apparatus, a deactivation request for deactivating the event policy, if the loop of the power status transition is detected.

15. A non-transitory computer-readable medium that has recorded thereon a program for causing a computer connected to an information processing apparatus comprising (a) a power log unit configured to record, in a log, that a power status change has been performed, (b) a sensing unit configured to sense that an event has occurred, (c) a status change unit configured to change power status in accordance with an event policy, and (d) a deactivation unit configured to deactivate the event policy in accordance with an event policy deactivation request from a management apparatus, to function as units comprising:
(1) an acquisition unit configured to acquire the log from the information processing apparatus;
(2) a detection unit configured to reference the log and detect a loop of power status transition; and
(3) a transmission unit configured to transmit, to the information processing apparatus, a deactivation request for deactivating the event policy, if the loop of the power status transition is detected.

16. A method for controlling, by a management apparatus, power status of an information processing apparatus connected to the management apparatus, the information processing apparatus comprising (a) a power log unit that records, in a log, that a power status change has been performed, (b) a sensing unit that senses that an event has occurred, (c) a status change unit that changes power status in accordance with an event policy, and (d) a deactivation unit that deactivates the event policy in accordance with an event policy deactivation request from the management apparatus, the method comprising:

acquiring the log from the information processing apparatus;

referencing the log and detecting a loop of power status transition; and transmitting, to the information processing apparatus, a deactivation request for deactivating the event policy, if the loop of the power status transition is detected.

* * * * *